(12) United States Patent
Watanabe et al.

(10) Patent No.: US 11,008,426 B2
(45) Date of Patent: May 18, 2021

(54) POLYARYLENE SULFIDE RESIN PARTICULATE AND METHOD OF PRODUCING SAME

(71) Applicant: Toray Industries, Inc., Tokyo (JP)

(72) Inventors: Kei Watanabe, Tokai (JP); Kazusada Takeda, Nagoya (JP); Hisashi Miyama, Tokyo (JP); Mikiya Nishida, Tokyo (JP)

(73) Assignee: Toray Industries, Inc., Tokyo (JP)

( * ) Notice: Subject to any disclaimer, the term of this patent is extended or adjusted under 35 U.S.C. 154(b) by 421 days.

(21) Appl. No.: 16/071,108

(22) PCT Filed: Jan. 17, 2017

(86) PCT No.: PCT/JP2017/001310
§ 371 (c)(1),
(2) Date: Jul. 19, 2018

(87) PCT Pub. No.: WO2017/126484
PCT Pub. Date: Jul. 27, 2017

(65) Prior Publication Data
US 2020/0354528 A1    Nov. 12, 2020

(30) Foreign Application Priority Data
Jan. 20, 2016   (JP) .............................. JP2016-008767

(51) Int. Cl.
| C08J 3/12 | (2006.01) |
| C08K 3/013 | (2018.01) |
| B29C 67/04 | (2017.01) |
| B33Y 70/00 | (2020.01) |
| C08K 3/36 | (2006.01) |
| B33Y 80/00 | (2015.01) |

(52) U.S. Cl.
CPC ................. *C08J 3/12* (2013.01); *B29C 67/04* (2013.01); *C08K 3/013* (2018.01); *C08K 3/36* (2013.01); *B33Y 70/00* (2014.12); *B33Y 80/00* (2014.12); *C08J 2381/06* (2013.01); *C08K 2201/003* (2013.01)

(58) Field of Classification Search
CPC ......... C08J 3/12; C08J 2381/06; B29C 67/04; C08K 3/36; C08K 3/016; C08K 2201/003; B33Y 80/00; B33Y 70/00
See application file for complete search history.

(56) References Cited

U.S. PATENT DOCUMENTS

| 3,919,177 | A | | 11/1975 | Campbell | |
| 5,272,185 | A | * | 12/1993 | Matsumura | ............ C09D 5/037 523/212 |
| 2016/0362524 | A1 | * | 12/2016 | Watanabe | .................. C08J 3/12 |

FOREIGN PATENT DOCUMENTS

| JP | 45-003368 B1 | 2/1970 |
| JP | 52-12240 B2 | 4/1977 |
| JP | 61-7332 A | 1/1986 |
| JP | 02-298527 A | 12/1990 |
| JP | 07-62240 A | 3/1995 |
| JP | 08-258064 A | 10/1996 |
| JP | 11-209617 A | 8/1999 |
| JP | 2002-003603 A | 1/2002 |
| JP | 2004-184606 A | 7/2004 |
| JP | 2004-211030 A | 7/2004 |
| JP | 2005-014214 A | 1/2005 |
| JP | 2009-292902 A | 12/2009 |
| WO | 2015/098748 A1 | 7/2015 |
| WO | 2015/129487 A1 | 9/2015 |
| WO | 2015/145844 A1 | 10/2015 |

* cited by examiner

*Primary Examiner* — Jessica M Roswell
(74) *Attorney, Agent, or Firm* — DLA Piper LLP (US)

(57) ABSTRACT

A polyarylene sulfide resin particulate has a mean particle diameter from more than 1 μm to 100 the uniformity is 4 or less, the melt viscosity measured at temperature of 300° C. and shear rate of 1216 sec$^{-1}$ is 150 to 500 Pa·s, and the recrystallization temperature, defined as temperature of the heat generation peak at the time of crystallization when cooled from 340° C. to 50° C. at 20° C./min using a differential scanning calorimeter, is 150 to 210° C. The polyarylene sulfide resin particulate is suitable as a material powder for producing a three-dimensional molding by a powder sintering three-dimensional printer can be provided efficiently.

13 Claims, No Drawings

POLYARYLENE SULFIDE RESIN PARTICULATE AND METHOD OF PRODUCING SAME

TECHNICAL FIELD

This disclosure relates to a polyarylene sulfide resin particulate and a method of producing the same, that suitably shapes a three-dimensional molding from powder material by a powder sintering three-dimensional printer.

BACKGROUND

A technique called Rapid Prototyping (RP) is known as a technique to form a three-dimensional object. With that technique, each layer is formed along a cross-sectional shape sliced to shape an object with respect to the laminating direction calculated with data (STL (Standard Triangulated Language) formatted data) which describes a surface of three-dimensional shape with collective triangles. To shape a three-dimensional object, it is possible to employ a known method such as Fused Deposition Molding (FDM), the UV curing ink jetting method, Stereo Lithography (SL), Selective Laser Sintering (SLS) and ink-jet binder method. Above all, it is advantageous to employ the Selective Laser Sintering which sequentially repeats a thin layer formation process to develop the thin layer with powder and a cross-section shape formation process to bind the powder with the formed thin layer by irradiating a laser to a shape corresponding to the cross-section of a shaped object, because the SLS is suitable for precision shaping more than other shaping methods and doesn't require support members. JP 2004-184606-A discloses a method of manufacturing an artificial bone model from powder mixture of synthetic resin powder of 30 to 90 wt % and inorganic filler of 10 to 70 wt %. Such a technique is promising as a method of manufacturing a complicated shape being hardly manufactured by a conventional molding method represented by injection molding and extrusion molding.

Conventional powder materials used with a powder sintering three-dimensional printer are made of thermoplastic resin such as polyamide 11 and polyamide 12 having a low melting point. Therefore, a three-dimensional molding shaped by a powder sintering three-dimensional printer can only be used as model or prototype requiring strength or heat resistance less than that of mounted members.

PolyArylene Sulfide (which may be abbreviated to PAS) such as PolyPhenylene Sulfide (which may be abbreviated to PPS) has excellent characteristics such as heat resistance, barrier characteristics, chemical resistance, electric insulation and moist heat resistance desirable for engineering plastics, and is used as various electric/electronic parts, machine parts and automotive parts, film, fiber and the like, manufactured mainly by injection molding or extrusion molding. However, currently available PAS doesn't have characteristics desirable for the powder sintering three-dimensional printer.

JP-H7-62240-A discloses a manufacturing method of PAS resin particulate, having a high melt viscosity, but has a broad particle size distribution and a high uniformity being not desirable for the powder sintering three-dimensional printer.

JP 2005-14214-A discloses a method of preparing PPS resin particulate having a narrow particle size distribution by cooling and precipitating the PPS dissolved in a solvent at a high temperature. However, such a method cannot shape a three-dimensional molding having a sufficiently high strength because of low melt viscosity of the PAS resin.

Accordingly, it could be helpful to efficiently prepare a polyarylene sulfide resin particulate as a powder material desirable to shape a three-dimensional molding with a powdery sintering three-dimensional printer.

SUMMARY

We thus provide:

(1) A polyarylene sulfide resin particulate having: 100 μm or less and more than 1 μm of mean particle diameter; 4 or less of uniformity; 150 Pa·s or more and 500 Pa·s or less of melt viscosity measured at 300° C. and shear rate of 1216 sec$^{-1}$; and 150 to 210° C. of crystallization temperature defined as a temperature of heat generation peak measured with a differential scanning calorimeter during crystallization as heated from 50° C. to 340° C. at 20° C./min, kept at 340° C. for 5 min and cooled from 340° C. to 50° C. at 20° C./min.

(2) The polyarylene sulfide resin particulate of (1), wherein the mean particle diameter is 10 μm or more and 50 μm or less.

(3) A polyarylene sulfide resin particulate mixture, containing 0.1 to 5 parts by weight of inorganic particle having a mean particle diameter of 20 nm or more and 500 nm or less relative to 100 parts by weight of the polyarylene sulfide resin particulate of (1) or (2).

(4) The polyarylene sulfide resin particulate mixture of (3), wherein the inorganic particle is a spherical silica particle.

(5) A polyarylene sulfide resin particulate mixture, containing 25 to 150 parts by weight of inorganic reinforcement having a maximum dimension of 1 μm or more and 400 μm or less, relative to 100 parts by weight of either the polyarylene sulfide resin particulate of (1) or (2) or the polyarylene sulfide resin particulate mixture of (3) or (4).

(6) The polyarylene sulfide resin particulate mixture of (5), wherein the inorganic reinforcement is at least one selected from glass bead, glass flake, glass fiber, carbon fiber, aluminum oxide, soda-lime glass, borosilicate glass, silica, aluminosilicate ceramic, limestone, gypsum, bentonite, precipitated sodium silicate, amorphous precipitated silica, amorphous precipitated calcium silicate, amorphous precipitated magnesium silicate, amorphous precipitated lithium silicate, sodium chloride, Portland cement, magnesium phosphate cement, magnesium oxychloride cement, magnesium oxysulfate cement, zinc phosphate cement and zinc oxide.

(7) A method of producing polyarylene sulfide resin particulate, comprising a step of pulverizing polyarylene sulfide resin particles having a mean particle diameter of 40 μm to 2 mm to produce the polyarylene sulfide resin particulate of (1) or (2).

(8) A method of producing three-dimensional molding, comprising a step of feeding either the polyarylene sulfide resin particulate of (1) or (2) or the polyarylene sulfide resin particulate mixture of any one of (3) to (6) to a powder sintering three-dimensional printer.

We can efficiently prepare a polyarylene sulfide resin particulate as a powder material desirable to shape a three-dimensional object with a powdery sintering three-dimensional printer.

DETAILED DESCRIPTION

PAS Resin

PAS means a homopolymer or a copolymer consisting primarily of repeating unit of formula "—(Ar—S)—" preferably contained by 80 mol % or more. The Ar is a group containing aromatic ring including atomic bonding and may be a bivalent repeating unit present in the following Formulae (A) to (K), and is preferably the repeating unit present in Formula (A).

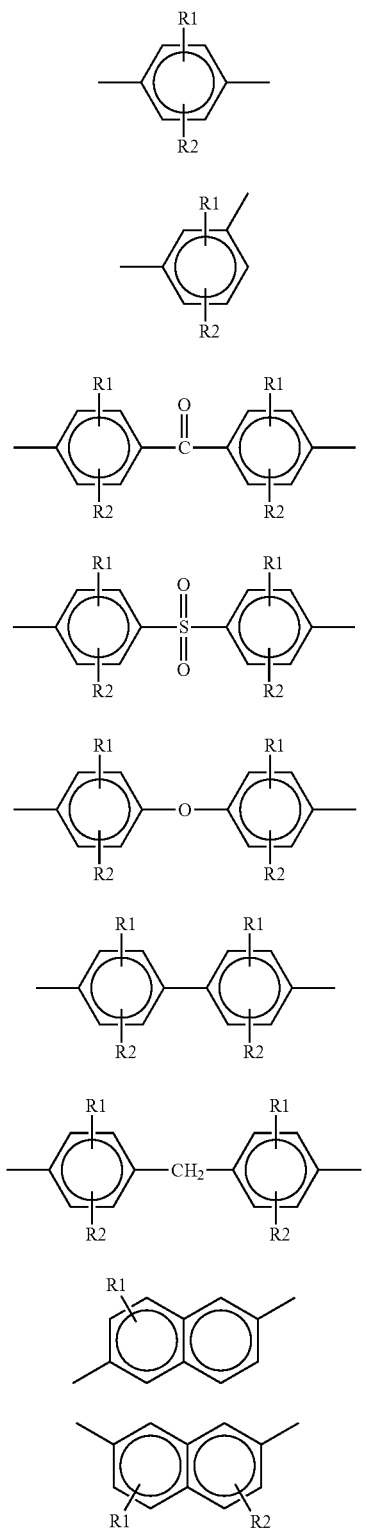

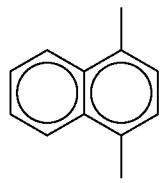

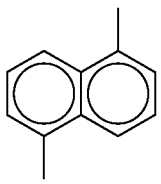

R1 and R2 indicate substituent groups selected from hydrogen, alkyl group of which carbon number is 1 to 6, alkoxy group of which carbon number is 1 to 6 and halogen group, wherein the R1 may be the same as R2.

The PAS may be a random copolymer or a block copolymer containing the repeating unit, or a mixture thereof.

Typical examples of the PAS are polyphenylene sulfide, polyphenylene sulfide sulfone, polyphenylene sulfide ketone, a random copolymer or a block copolymer thereof, or a mixture thereof. It is preferable that the PAS consists primarily of p-phenylene sulfide unit of no less than 80 mol % or 90 mol % as a main component of polymer such as polyphenylene sulfide, polyphenylene sulfide sulfone and polyphenylene sulfide ketone.

The PAS can be produced by such a method as disclosed in JP-S45-3368-B to obtain a polymer having a relatively small molecular weight or alternatively, can be produced by such a method as disclosed in JP-S52-12240-B and JP-S61-7332-A to obtain a polymer having a relatively great molecular weight. Thus obtained PPS resin can be subject to a treatment before use such as heating in the air for cross-linkage/increased molecular weight, heat treatment in atmosphere of inert gas of nitrogen or the like or under reduced pressure, washing with organic solvent, hot water or acid solution, activation with acid anhydride, amine, the isocyanate or functional group-containing compound of disulfide compound or the like.

The PAS resin particle is not limited in particular, and may be the polymer itself prepared as described above or may be produced from the PAS resin formed as a pellet, fiber or film. The PAS resin particle means PAS resin having a particle diameter within or greater than a desirable range. The PAS resin may be subject to a pulverization treatment to be described later as needed for target form of PAS resin particle. It may also be subject to a treatment such as method of spray drying after dissolving raw materials in solvent, method of poor solvent precipitation to contact poor solvent with emulsion formed in solvent, method of liquid drying to remove organic solvent from emulsion formed in solvent and method of forcible melt kneading to remove sea-component with solvent from sea-island structure made by mechanically kneading a resin component to become particulate together with another resin component.

It is preferable that the PAS has a melt viscosity of 500 Pa·s to 150 Pa·s. The melt viscosity of less than 150 Pa·s might decrease in strength of three-dimensional molding while the melt viscosity of more than 500 Pa·s might greatly decrease in strength with respect to the height direction because melted resin cannot permeate the lower layer when a laser is irradiated to melt PAS resin so that the interlayer adhesion is weakened. CAPILOGRAPH 1C made by Toyo Seiki Seisaku-sho, Ltd. is used to measure the melt viscosity with die having hole length of 10.00 mm and hole diameter of 0.50 mm in a way that a sample of about 20 g is fed to a cylinder heated to 300° C. to be kept for 5 min and then the melt viscosity is measured in a condition of shear rate of 1216 $sec^{-1}$. It is preferable that the lower limit of melt viscosity is 150 Pa·s. It is more preferably 160 Pa·s, further preferably 170 Pa·s and particularly preferably 180 Pa·s. It is preferable that the upper limit of melt viscosity is 500 Pa·s. It is more preferably 450 Pa·s, further preferably 400 Pa·s and particularly preferably 350 Pa·s.

To adjust the melt viscosity of PAS in a desired range, it is possible to employ a method such as method of adjusting the proportion of sulfidizing agent and dihalogenated aromatic compound at the time of polymerization, method of adding auxiliary agent of polymerization and/or polyhalogenated aromatic compound in addition to the sulfidizing agent and dihalogenated aromatic compound and method of oxidative cross-linking by heating the PAS in oxygen atmosphere.

It is preferable that the PAS has a crystallization temperature of 150° C. to 210° C. The PAS crystallization temperature of less than 150° C. might greatly slow the solidification after irradiating laser so that uniform powder surface cannot be formed when powder is laminated on the upper layer. The PAS crystallization temperature of more than 210° C. might crystallize the melt PAS resin by laser irradiation to generate shrinkage or warpage. Once the warpage is generated, a desirable shape of three-dimensional molding cannot be obtained because of dragging caused by laminating the upper layer. The crystallization temperature means a temperature of heat generation peak measured at the time of crystallization with a differential scanning calorimeter in nitrogen atmosphere through a process, in which the PAS resin particulate is heated from 50° C. to 340° C. at rate of 20° C./min, is kept at 340° C. for 5 min, and is cooled from 340° C. to 50° C. at rate of 20° C./min. It is preferable that the lower limit of crystallization temperature is 150° C. It is more preferably 153° C., further preferably 155° C., and particularly preferably 160° C. It is preferable that the upper limit of crystallization temperature is 210° C. It is more preferably 205° C., further preferably 200° C., and particularly preferably 195° C.

To adjust the crystallization temperature of PAS, it is possible to employ a method of washing the polymerized PAS resin with organic acid metal salt or inorganic acid metal salt. It is preferable that the washing is performed after removing residual oligomer and residual salt with warm water or hot water. The organic acid metal salt or the inorganic acid metal salt may be calcium acetate, magnesium acetate, sodium acetate, potassium acetate, calcium propionate, magnesium propionate, sodium propionate, potassium propionate, calcium chloride, magnesium chloride, sodium hydrochloride, potassium chloride or the like. It is preferable that the PAS is washed with 0.01 to 5 wt % of the organic acid metal salt or the inorganic acid metal salt. It is also preferable that the PAS is washed at 50° C. to 90° C. with an aqueous solution of the organic acid metal salt or the inorganic acid metal salt. It is preferable that a bath ratio of the PAS and the aqueous solution is the PAS of 10 to 500 g to the aqueous solution of 1 liter.

PAS Resin Particulate

This example uses PAS resin particulate having a mean particle diameter of more than 1 μm and 100 μm or less. It is preferable that the lower limit of the mean particle diameter of the PAS resin is 3 μm. It is more preferably 5 μm, further preferably 8 μm, particularly preferably 10 μm, remarkably preferably 13 μm and most preferably 15 μm. It is preferable that the upper limit of the mean particle diameter is 95 μm. It is more preferably 90 μm, further preferably 85 μm, particularly preferably 80 μm, remarkably preferably 75 μm and most preferably 70 μm. The mean particle diameter of the PAS resin particulate of more than 100 μm might not be able to form a uniform powder surface at the time of powder lamination with a powder sintering three-dimensional printer. The mean particle diameter of the PAS resin particulate of less than 1 μm might not be able to form a uniform surface as well because the particulate aggregates.

It is preferable that the PAS resin particulate has a uniformity in particle size distribution. It is preferable that the uniformity of the PAS resin particulate is 4.0 or less. It is more preferably 3.5 or less, further preferably 3.0 or less, particularly preferably 2.5 or less and remarkably preferably 2.0 or less. Although the lower limit of the uniformity is 1 theoretically, it is practically preferably 1.1 or more. It is more preferably 1.2 or more, further preferably 1.3 or more, particularly preferably 1.4 or more and remarkably preferably 1.5 or more. The uniformity of the PAS resin particulate of more than 4 might not be able to achieve the desired effect to form a uniform powder surface at the time of powder lamination with a three-dimensional printer even when the mean particle diameter is within a proper range.

The mean particle diameter of the PAS resin particulate is a particle diameter (d50) of which cumulative frequency is 50% from the smaller particle diameter side of particle size distribution measured with a laser diffraction particle size distribution meter based on the dispersion/diffraction theory of Mie.

The uniformity of the PAS resin particulate is a quotient of particle diameter (d60) of which cumulative frequency is 60% from the smaller particle diameter side of particle size distribution measured by the above-described method divided by particle diameter (d10) of which cumulative frequency is 10% from the smaller particle diameter side.

Inorganic Particle

Inorganic particle can be added to improve the fluidity of polyarylene sulfide resin particulate mixture. The uniformity of PAS resin particulate tends to deteriorate by interaction of neighbor particles when the particle diameter is small. Therefore, the uniformity of particulate mixture can be improved by adding inorganic particles having a particle diameter smaller than that of PAS resin particulate to widen the interparticle distance.

This example uses inorganic particles having a mean particle diameter of 20 nm to 50 nm to be added to the PAS resin particulate. The mean particle diameter is determined by the same method as the above-described mean particle diameter of PAS resin particulate.

It is preferable that the upper limit of the mean particle diameter of the inorganic particles is 500 nm. It is preferably 400 nm, more preferably 300 nm, particularly preferably 250 nm and remarkably preferably 200 nm. It is preferable that the lower limit is 20 nm. It is preferably 30 nm, more preferably 40 nm and particularly preferably 50 nm. The mean particle diameter of inorganic particles of 500 nm or less can achieve a uniform dispersion to the PAS resin particulate. The mean particle diameter of inorganic particles of 20 nm or more can achieve a sufficient effect to improve the fluidity of the PAS resin particulate mixture.

The inorganic particles to be added having the above-described particle diameter may be calcium carbonate powder such as light calcium carbonate, heavy calcium carbonate, fine calcium carbonate and specialty calcium-based filler, nepheline syenite fine powder, montmorillonite, calcined clay such as bentonite, clay (aluminum silicate powder) such as silane-modified clay, talc, powder silica (silicon dioxide) such as molten silica, crystal silica and amorphous silica, silicic acid-containing compound such as diatomaceous earth and quartz sand, pulverized natural mineral product such as pumice powder, pumice balloon, slate powder and mica powder, alumina-containing compound such as alumina (aluminum oxide) alumina colloid (alumina sol), alumina white and aluminum sulfate, mineral such as barium sulfate, lithopone, calcium sulfate, molybdenum disulfide and graphite (black lead), glass-based filler such as glass fiber, glass bead, glass flake, foaming glass bead, fly ash ball, volcanic glass hollow body, synthetic inorganic hollow body, potassium titanate single crystal, carbon fiber, carbon nanotube, carbon hollow sphere, carbon 64 fullerene, smokeless coal powder, artificial cryolite, titanium oxide, magnesium oxide, basic magnesium carbonate, dolomite, potassium titanate, calcium sulfite, mica, asbestos, calcium silicate, aluminum powder, molybdenum sulfide, boron fiber, silicon carbide fiber. It is preferable to employ calcium carbonate powder, silica powder, alumina-containing compound or glass-based filler. It is particularly preferable to employ silica powder such as amorphous silica powder which is less noxious to human body as an industrially preferable example.

The inorganic particle may have a shape being spherical, porous, hollow, infinite or the like. It is preferable that the shape is spherical from a viewpoint of good fluidity. The spherical shape includes a distorted sphere as well as a true sphere. The shape of the inorganic particle should be evaluated with degree of circularity of two-dimensional projection of particle. The degree of circularity means a value calculated by a formula of (Peripheral length of circle having the same area as projected image of particle)/(Peripheral length of projected image of particle). It is preferable that the inorganic particles have a mean degree of circularity of 0.7 to 1, more preferably 0.8 to 1 and further preferably 0.9 to 1.

To achieve the desired effect, it is preferable that the silica powder is made of sol-gel method silica produced by sol-gel process among possible processes such as combustion process to combust silane compound to produce fumed silica, deflagration process to deflagrate metal silicate powder to produce deflagrated silica, process to neutralize sodium silicate with mineral acid to produce wet silica, polymerization process to polymerize alkaline silicic acid made from acidic silicic acid prepared by removing natrium from sodium silicate with ion exchange resin to produce colloidal silica (silica sol) and sol-gel process to hydrolyze silane compound to produce sol-gel method silica. Besides, the wet silica aggregated by synthesis in alkaline condition is called sedimented silica while the wet silica aggregated by synthesis in acidic condition is called gel method silica.

It is preferable that the inorganic particle is made of silica, preferably sol-gel method silica and/or spherical silica, further preferably sol-gel method spherical silica.

It is more preferable that the inorganic particle is subject to hydrophobic surface treatment with silane compound or silazane compound. The treated hydrophobic surface can suppress aggregation between inorganic particles to improve dispersion of inorganic particle into the PAS resin particulate. The above silane compound may be a unsubstituted or halogen-substituted trialkoxy silane such as methyl trimethoxysilane, methyl triethoxysilane, ethyl trimethoxysilane, ethyl triethoxysilane, n-propyl trimethoxysilane, n-propyl triethoxysilane, isopropyl trimethoxysilane, isopropyl triethoxysilane, butyl trimethoxysilane, butyl triethoxysilane, hexyl trimethoxy silane, trifluoropropyl trimethoxysilane and heptadecafluorodecyl trimethoxysilane. It is preferably methyl trimethoxysilane, methyl triethoxysilane, ethyl trimethoxysilane or ethyl triethoxysilane, more preferably methyl trimethoxysilane, methyl triethoxysilane or product of partial hydrolysis/condensation. The silazane compound may be hexamethyldisilazane or hexaethyl disilazane and is preferably hexamethyldisilazane. A monofunctional silane compound may be a monosilanol compound such as trimethylsilanol and triethyl silanol, a monochloro silane such as trimethyl chlorosilane and triethyl chlorosilane, a monoalkoxy silane such as trimethyl methoxysilane and trimethyl ethoxysilane, a monoamino silane such as trimethylsilyl dimethylamine, trimethylsilyl diethyl amine, or a monoacyl oxysilane such as trimethyl acetoxy silane. It is preferably trimethylsilanol, trimethyl methoxysilane or trimethylsilyl diethylamine, particularly preferably trimethylsilanol or trimethyl methoxysilane.

These inorganic particles can be used by each one or combination of two kinds or more.

The inorganic particle of 0.1 to 5 parts by weight should be contained in the PAS resin particulate of 100 parts by weight. It is preferable that the upper limit of the content is 5 parts by weight. It is preferably 4 parts by weight, further preferably 3 parts by weight. It is preferable that the lower limit of the content is 0.2 parts by weight. It is preferably 0.3 parts by weight, further preferably 0.4 parts by weight.

Inorganic Reinforcement

The PAS resin particulate may contain inorganic reinforcement to improve the strength of three-dimensional molding produced with the PAS resin particulate. The inorganic reinforcement is made of inorganic material shaped like particle, needle, pillar, fiber or the like, suitable for reinforcing mechanical characteristics of three-dimensional molding produced with the PAS resin particulate mixture.

It is preferable that the inorganic reinforcement contained in the PAS resin particulate has a maximum dimension of 1 μm to 400 μm, although it is not limited in particular. The maximum dimension means a mean value of maximum distances between arbitrarily-selected two points on outer outline of each inorganic reinforcement among randomly-selected 100 pieces of inorganic reinforcement by observing the electron microscope images magnified by 10,000 times to 100,000 times.

It is preferable that the upper limit of the maximum dimension of the inorganic reinforcement is 400 μm. It is preferably 390 μm, more preferably 380 μm and particularly preferably 370 μm. It is preferable that the lower limit is 1 μm. It is preferably 5 μm, more preferably 10 μm and particularly preferably 15 μm. The maximum dimension of the inorganic reinforcement of 400 μm or less can form a uniform powder surface at the time of powder lamination with a powder sintering method three-dimensional printer without spoiling the fluidity of the PAS resin particulate mixture. The maximum dimension of the inorganic reinforcement of 1 μm or more can improve the strength of three-dimensional molding produced with the PAS resin particulate mixture.

The inorganic reinforcement having the above-described maximum dimension may be calcium carbonate powder such as light calcium carbonate, heavy calcium carbonate, fine calcium carbonate and specialty calcium-based filler, nepheline syenite fine powder, montmorillonite, calcined clay such as bentonite, clay (aluminum silicate powder) such as silane-modified clay, talc, powder silica (silicon dioxide) such as molten silica, crystal silica and amorphous silica, silicic acid-containing compound such as diatomaceous earth and quartz sand, pulverized natural mineral product such as pumice powder, pumice balloon, slate powder and mica powder, alumina-containing compound such as alumina (aluminum oxide) alumina colloid (alumina sol), alumina white and aluminum sulfate, mineral such as barium sulfate, lithopone, calcium sulfate, molybdenum disulfide and graphite (black lead), glass-based filler such as glass fiber, glass bead, glass flake, foaming glass bead, fly ash ball, volcanic glass hollow body, synthetic inorganic hollow body, potassium titanate single crystal, carbon fiber, carbon nanotube, carbon hollow sphere, carbon 64 fullerene, smokeless coal powder, artificial cryolite, titanium oxide, magnesium oxide, basic magnesium carbonate, dolomite, potassium titanate, calcium sulfite, mica, asbestos, calcium silicate, aluminum powder, molybdenum sulfide, boron fiber, silicon carbide fiber. It is preferable to employ glass-based filler or carbon fiber. These inorganic particles can be used by each one or combination of two kinds or more. It is possible to use both inorganic particle and inorganic reinforcement.

Production Process of PAS Resin Particulate

The particulate can be produced from a raw material of PAS resin particle having a greater mean particle diameter or a greater uniformity (nonuniform particles) by being subject to a treatment such as method of pulverization, method of spray drying after dissolving raw materials in solvent, method of poor solvent precipitation to contact poor solvent with emulsion formed in solvent, method of liquid drying to remove organic solvent from emulsion formed in solvent and method of forcible melt kneading to remove sea-component with solvent from sea-island structure made by mechanically kneading a resin component to become particulate together with another resin component.

From a viewpoint of economic efficiency, it is preferable to employ a pulverization with jet mill, bead mill, hammer mill, ball mill, sand mill, turbo mill or cryogenic mill. It is preferable to employ a dry mill such as turbo mill, jet mill and cryogenic mill, further preferably cryogenic mill.

The PAS resin particulate may contain inorganic particle and inorganic reinforcement. The resin particulate, the inorganic particle and the inorganic reinforcement may be blended by a well-known method to make a uniform resin particulate mixture. It is possible that the inorganic particle and the inorganic reinforcement are added at the time of the above-described pulverization to perform the pulverization and the blend at the same time.

The blend may be performed by a method such as shaking, pulverization with ball mill, coffee mill or the like, stirring with blade such as Nauta mixer or Henschel mixer, rotating the container with V-shape rotating mixer or the like, drying after blending the liquid phase in solvent, stirring with airflow generated by flash blender, spraying particulate and/or slurry with atomizer or the like.

The molding shaped by a powder sintering method from the PAS resin particulate mixture has high heat resistance, chemical resistance and dimension stability derived from the PAS resin as well as excellent mechanical strength derived from powder material having proper melt viscosity. When the raw material contains PAS resin particulate having a small mean particle diameter and a small uniformity, a molding can be produced with excellent shape and less defect.

EXAMPLES

Hereinafter, our particulates and methods will be explained with reference to Examples and Comparative Examples, although this disclosure is not limited to the Examples or the like. Characteristics are measured by the following methods.

Mean Particle Diameter

Mean particle diameter is measured with laser diffraction/scattering type particle counter MT3300EXII made by Nikkiso Co., Ltd. by using disperse medium of 0.5 wt % solution of polyoxyethylene cumyl phenyl ether (product name: Nonal 912A; TOHO CHEMICAL IN-DUSTRY Co., Ltd.). Specifically, the mean particle diameter of the PAS resin particulate is defined as particle diameter (median diameter: d50) at 50% cumulative frequency from the smaller particle diameter side of cumulative curve obtained under a condition of 100% of total volume of particles calculated by analyzing laser scattering light according to the microtrac method.

Uniformity

Uniformity of the PAS resin particulate is defined as ratio d60/d10 of particle size distribution measured with laser diffraction/scattering type particle counter MT3300EXII made by Nikkiso Co., Ltd. The broader the particle size distribution, the greater the uniformity is.

Melt Viscosity

Melt viscosity of the PAS resin particulate is determined with CAPILOGRAPH 1C made by Toyo Seiki Seisaku-sho, Ltd. by using a die having hole length of 10.00 mm and hole diameter of 0.50 mm. Sample of about 20 g is fed to a cylinder at 300° C. to be kept for 5 min, and is subject to the measurement at shear rate of $1216 \text{ sec}^{-1}$.

Crystallization Temperature

Crystallization temperature of the PAS resin particulate is determined with DSC7 made by PerkinElmer Inc. by using particulate of about 10 mg in nitrogen atmosphere according to the following measurement condition:

kept at 50° C.×1 min
temperature increase rate of 20° C./min from 50° C. to 340° C. kept at 340° C.×5 min
temperature decrease rate of 20° C./min from 340° C. to 50° C.

The crystallization temperature is determined to be value at the top of the heat generation peak accompanied by crystallization while decreasing temperature.

Tensile Strength

Tensile strength after molding the three-dimensional molding produced with PAS resin particulate is measured with Universal Material Testing Instrument (TENSILON RTG-1250, made by A&D Company, Limited) by preparing ISO1A type test piece with a powder sintering three-dimensional printer. The tensile strength is determined by averaging values measured according to ISO-527-1 for six times.

Production Example 1

A one-liter autoclave with stirring machine containing 47 wt % Sodium hydrosulfide of 1.00 mol, 46 wt % sodium hydroxide of 1.05 mol, N-methyl-2-pyrrolidone (NMP) of 1.65 mol, sodium acetate of 0.45 mol and ion exchanged water of 5.55 mol was gradually heated for 2 hours until 225° C. by flowing nitrogen at ordinary pressure to distill water of 11.70 mol and NMP of 0.02 mol, and then the reaction container was cooled to 160° C. Besides, hydrogen sulfide of 0.01 mol flew apart.

Next, p-dichlorobenzene (p-DCB) of 1.02 mol and NMP of 1.32 mol were added to and the reaction container was sealed with nitrogen gas. Then, while being stirred at 400 rpm, the temperature was increased by two phases of 90 min from 200° C. to 240° C. and 30 min from 240° C. to 270°

C. Water of 0.75 mol was injected therein for 15 min from ten minutes after reaching 270° C. It was cooled off at rate of 1.0° C./min down to 200° C. after keeping at 270° C. for 120 min and then cooled rapidly to take the content out around room temperature.

The content taken out was diluted with NMP of 0.5 liter and sieved by 80 mesh to separate solvent from solid. Thus obtained particles were washed with warm water of 1 liter for several times, then washed with 0.45 wt % solution of calcium acetate monohydrate of 800 g to the PAS, and further washed with warm water of 1 liter to sieved to separate a cake.

The cake obtained was dried up at 120° C. in nitrogen flow to obtain PAS-1. Thus obtained PAS-1 had mean particle diameter of 1,600 μm, uniformity of 4.1, melt viscosity of 210 Pa·s and crystallization temperature of 168° C.

Production Example 2

PAS-2 was obtained by the same manner as Production example 1, except that the calcium acetate solution was replaced by 0.55 wt % acetic acid solution of 800 g. Obtained PAS-2 had mean particle diameter of 1,600 μm, uniformity of 4.1, melt viscosity of 170 Pa·s and crystallization temperature of 231° C.

Production Example 3

A one-liter autoclave with stirring machine containing 47 wt % Sodium hydrosulfide of 1.00 mol, 48 wt % sodium hydroxide of 1.04 mol, N-methyl-2-pyrrolidone (NMP) of 2.12 mol and ion exchanged water of 5.55 mol was gradually heated for 2 hours until 225° C. by flowing nitrogen at ordinary pressure to distill water of 11.70 mol and NMP of 0.02 mol, and then the reaction container was cooled to 160° C. Besides, hydrogen sulfide of 0.01 mol flew apart.

Next, p-dichlorobenzene (p-DCB) of 1.03 mol and NMP of 0.76 mol were added to and the reaction container was sealed with nitrogen gas. Then, while being stirred at 400 rpm, the temperature was increased for 125 min from 200° C. to 270° C. and was kept at 276° C. for 65 min, and then cooled rapidly to take the content out around room temperature.

Thus obtained solid and ion exchanged water of 750 milliliters were put into an autoclave with stirring machine, washed at 70° C. for 30 min and then sucked and filtered with a glass filter. Next, 4 liters of ion exchanged water heated to 70° C. was poured to a glass filter to be sucked and filtered to obtain a cake.

An autoclave with stirring machine containing 0.17 wt % of calcium acetate monohydrate added to the obtained cake and ion exchanged water of 600 liters was substituted inside with nitrogen and heated to 190° C. and kept for 30 min. Then, the autoclave was cooled off to take the content out.

The content was sucked and filtered with a glass filter, and then ion exchanged water of 500 milliliters at 70° C. was poured thereto to be sucked and filtered to obtain a cake.

The cake obtained was dried up at 120° C. in nitrogen flow to obtain PAS-3. Thus obtained PAS-3 had mean particle diameter of 40 μm, uniformity of 5.0, melt viscosity of 23 Pa·s and crystallization temperature of 201° C.

Example 1

PAS-1 was pulverized with a jet mill (100AFG made by Hosokawa Micron Corporation) for 120 min to obtain PAS particulate having mean particle diameter of 50 μm and uniformity of 1.6. A three-dimensional molding was produced with a powder sintering three-dimensional printer (Rafael 300 made by Aspect, Inc.) using the particulate. A good three-dimensional molding was obtained without rough powder surface at the time of powder lamination and warpage at the time of laser irradiation. The three-dimensional molding had tensile strength of 57 MPa.

Example 2

Sol-gel method silica (X-24-9600A made by Shin-Etsu Chemical Co., Ltd.) of 1.0 kg having mean particle diameter of 170 nm with surface treated by hexamethyldisilazane was added to 100 kg of PAS particulate having mean particle diameter of 50 μm and uniformity of 1.6 pulverized with a jet mill (100AFG made by Hosokawa Micron Corporation) for 120 min to obtain PAS particulate mixture. A three-dimensional molding was produced with a powder sintering three-dimensional printer (Rafael 300 made by Aspect, Inc.) using the particulate mixture. A good three-dimensional molding was obtained without rough powder surface at the time of powder lamination and warpage at the time of laser irradiation. The obtained three-dimensional molding had very good appearance and less rough surface. The three-dimensional molding had tensile strength of 50 MPa.

Example 3

PAS particulate mixture was obtained by the same manner as Example 2, except that 0.3 kg of sol-gel method silica was added. A three-dimensional molding was produced with a powder sintering three-dimensional printer (Rafael 300 made by Aspect, Inc.) using the particulate mixture. A good three-dimensional molding was obtained without rough powder surface at the time of powder lamination and warpage at the time of laser irradiation. The obtained three-dimensional molding had very good appearance and less rough surface. The three-dimensional molding had tensile strength of 52 MPa.

Example 4

Glass bead (EGB731B made by Potters-Ballotini Co., Ltd) of 30 kg having maximum dimension of 28 μm was added to 70 kg of PAS particulate having mean particle diameter of 50 μm and uniformity of 1.6 pulverized with a jet mill (100AFG made by Hosokawa Micron Corporation) for 120 min and was blended by a V-shape rotating mixer. A three-dimensional molding was produced with a powder sintering three-dimensional printer (Rafael 300 made by Aspect, Inc.) using the particulate mixture. A good three-dimensional molding was obtained without rough powder surface at the time of powder lamination and warpage at the time of laser irradiation. The three-dimensional molding had tensile strength of 62 MPa.

Example 5

Sol-gel method silica (X-24-9600A made by Shin-Etsu Chemical Co., Ltd.) of 1.0 kg having mean particle diameter of 170 nm with surface treated by hexamethyldisilazane and glass bead (EGB731B made by Potters-Ballotini Co., Ltd) of 30 kg having maximum dimension of 28 μm were added to 70 kg of PAS particulate having mean particle diameter of 50 μm and uniformity of 1.6 pulverized with a jet mill (100AFG made by Hosokawa Micron Corporation) for 120 min and was blended by a V-shape rotating mixer. A three-dimensional molding was produced with a powder sintering three-dimensional printer (Rafael 300 made by Aspect, Inc.) using the particulate mixture. A good three-dimensional molding was obtained without rough powder surface at the time of powder lamination and warpage at the time of laser irradiation. The obtained three-dimensional molding had very good appearance and less rough surface. The three-dimensional molding had tensile strength of 60 MPa.

Example 6

PAS particulate mixture was obtained by the same manner as Example 4, except that the added inorganic reinforcement was made of glass flake (REF-160 made by Nippon Sheet Glass Company, Ltd.) having maximum dimension of 358 μm. A three-dimensional molding was produced with a powder sintering three-dimensional printer (Rafael 300 made by Aspect, Inc.) using the particulate mixture. A good three-dimensional molding was obtained without rough powder surface at the time of powder lamination and warpage at the time of laser irradiation. The obtained three-dimensional molding had very good appearance and less rough surface. The three-dimensional molding had tensile strength of 65 MPa.

Example 7

PAS particulate mixture was obtained by the same manner as Example 4, except that the added inorganic reinforcements were 20 kg of glass flake (REF-160 made by Nippon Sheet Glass Company, Ltd.) having maximum dimension of 358 μm and 10 kg of glass fiber (EPG70M-01N made by Nippon Electric Glass Co., Ltd.) having maximum dimension of 224 μm. A three-dimensional molding was produced with a powder sintering three-dimensional printer (Rafael 300 made by Aspect, Inc.) using the particulate mixture. A good three-dimensional molding was obtained without rough powder surface at the time of powder lamination and warpage at the time of laser irradiation. The obtained three-dimensional molding had very good appearance and less rough surface. The three-dimensional molding had tensile strength of 68 MPa.

Comparative Example 1

PAS-2 was pulverized with a jet mill (100AFG made by Hosokawa Micron Corporation) for 120 min to obtain PAS particulate having mean particle diameter of 48 μm and uniformity of 1.6. The particulate was applied to a powder sintering three-dimensional printer (Rafael 300 made by Aspect, Inc.) to produce a three-dimensional molding. No three-dimensional molding was obtained because warpage was generated at the time of laser irradiation.

Comparative Example 2

PAS-3 was applied to a powder sintering three-dimensional printer (Rafael 300 made by Aspect, Inc.) to produce a three-dimensional molding. No three-dimensional molding was obtained because rough powder surface was generated at the time of powder lamination.

Comparative Example 3

PAS-3 was pulverized with a jet mill (100AFG made by Hosokawa Micron Corporation) for 60 min to obtain PAS particulate having mean particle diameter of 15 μm and uniformity of 3.2. A three-dimensional molding was produced with a powder sintering three-dimensional printer (Rafael 300 made by Aspect, Inc.) using the particulate mixture. A three-dimensional molding was obtained without rough powder surface at the time of powder lamination and warpage at the time of laser irradiation. The obtained three-dimensional molding had rough surface partially. The three-dimensional molding had tensile strength of 18 MPa.

TABLE 1

| | PAS resin particulates | | | | Inorganic particles | | Inorganic reinforcements | | | Three-dimensional molding characteristics | |
|---|---|---|---|---|---|---|---|---|---|---|---|
| | Mean particle diameter [μm] | Uniformity | Melt viscosity [Pa·s] | Crystallization temperature [°C.] | Mean particle diameter [nm] | Quantity of additive [part by weight] | Kind | Quantity of additive [part by weight] | Maximum dimension [μm] | Tensile strength [MPa] | Appearance |
| Example 1 | 50 | 1.6 | 210 | 168 | — | — | — | — | — | 57 | Good (No rough surface) |
| Example 2 | 50 | 1.6 | 210 | 168 | 170 | 1 | — | — | — | 50 | Excellent (No rough surface) |
| Example 3 | 50 | 1.6 | 210 | 168 | 170 | 0.3 | — | — | — | 52 | Excellent (No rough surface) |
| Example 4 | 50 | 1.6 | 210 | 168 | — | — | Glass bead | 42.9 | 28 | 62 | Good (No rough surface) |
| Example 5 | 50 | 1.6 | 210 | 168 | 170 | 0.4 | Glass bead | 42.9 | 28 | 60 | Excellent (No rough surface) |
| Example 6 | 50 | 1.6 | 210 | 168 | 170 | 0.4 | Glass bead | 42.9 | 358 | 65 | Excellent (No rough surface) |
| Example 7 | 50 | 1.6 | 210 | 168 | — | — | Glass flake Glass fiber | 28.6 14.3 | 358 224 | 68 | Excellent (No rough surface) |
| Comparative example 1 | 48 | 1.6 | 170 | 231 | — | — | — | — | — | — | — |
| Comparative example 2 | 40 | 5 | 23 | 201 | — | — | — | — | — | — | — |
| Comparative example 3 | 15 | 3.2 | 23 | 201 | — | — | — | — | — | 18 | Partially rough surface |

INDUSTRIAL APPLICATIONS

We can produce PAS resin particulate having a fine particle diameter and uniform particle size distribution to form a smooth powder surface with a powder sintering three-dimensional printer. Because our PAS resin particulate having a proper crystallization temperature, shrinkage is not generated by crystallization when the PAS resin is melted by irradiating laser so that warpage is prevented on the three-dimensional molding. Our PAS resin particulate has a proper melt viscosity so that a three-dimensional molding having a high strength can be provided.

The invention claimed is:

1. A method of producing three-dimensional molding comprising feeding a polyarylene sulfide resin particulate to a powder sintering three-dimensional printer, wherein the polyarylene sulfide resin particulate has: 100 µm or less and more than 1 µm of mean particle diameter; 4 or less of uniformity; 150 Pa·s or more and 500 Pa·s or less of melt viscosity measured at 300° C. and shear rate of 1216 sec$^{-1}$; and 150 to 210° C. of crystallization temperature defined as a temperature of heat generation peak measured with a differential scanning calorimeter during crystallization as heated from 50° C. to 340° C. at 20° C./min, kept at 340° C. for 5 min and cooled from 340° C. to 50° C. at 20° C./min.

2. The method according to claim 1, wherein the mean particle diameter is 10 µm or more and 50 µm or less.

3. The method according to claim 1, wherein the polyarylene sulfide resin particulate contains 25 to 150 parts by weight of inorganic reinforcement having a maximum dimension of 1 µm or more and 400 µm or less, relative to 100 parts by weight of the polyarylene sulfide resin particulate.

4. The method according to claim 1 comprising feeding a polyarylene sulfide resin particulate to the powder sintering three-dimensional printer, wherein the polyarylene sulfide resin particulate contains 0.1 to 5 parts by weight of inorganic particle having a mean particle diameter of 20 nm or more and 500 nm or less relative to 100 parts by weight of the polyarylene sulfide resin particulate.

5. The method according to claim 4, wherein the inorganic particle is a spherical silica particle.

6. The method according to claim 4, wherein the polyarylene sulfide resin particulate contains 25 to 150 parts by weight of inorganic reinforcement having a maximum dimension of 1 µm or more and 400 µm or less, relative to 100 parts by weight of the polyarylene sulfide resin particulate.

7. The method according to claim 3, wherein the inorganic reinforcement is at least one selected from glass bead, glass flake, glass fiber, carbon fiber, aluminum oxide, soda-lime glass, borosilicate glass, silica, aluminosilicate ceramic, limestone, gypsum, bentonite, precipitated sodium silicate, amorphous precipitated silica, amorphous precipitated calcium silicate, amorphous precipitated magnesium silicate, amorphous precipitated lithium silicate, sodium chloride, Portland cement, magnesium phosphate cement, magnesium oxychloride cement, magnesium oxysulfate cement, zinc phosphate cement and zinc oxide.

8. The method according to claim 2, wherein the polyarylene sulfide resin particulate contains 25 to 150 parts by weight of inorganic reinforcement having a maximum dimension of 1 µm or more and 400 µm or less, relative to 100 parts by weight of the polyarylene sulfide resin particulate.

9. The method according to claim 2 comprising feeding a polyarylene sulfide resin particulate to the powder sintering three-dimensional printer, wherein the polyarylene sulfide resin particulate contains 0.1 to 5 parts by weight of inorganic particle having a mean particle diameter of 20 nm or more and 500 nm or less relative to 100 parts by weight of the polyarylene sulfide resin particulate.

10. The method according to claim 3 comprising feeding a polyarylene sulfide resin particulate to the powder sintering three-dimensional printer, wherein the polyarylene sulfide resin particulate contains 0.1 to 5 parts by weight of inorganic particle having a mean particle diameter of 20 nm or more and 500 nm or less relative to 100 parts by weight of the polyarylene sulfide resin particulate.

11. The method according to claim 5, wherein the polyarylene sulfide resin particulate contains 25 to 150 parts by weight of inorganic reinforcement having a maximum dimension of 1 µm or more and 400 µm or less, relative to 100 parts by weight of the polyarylene sulfide resin particulate.

12. The method according to claim 6, wherein the inorganic reinforcement is at least one selected from glass bead, glass flake, glass fiber, carbon fiber, aluminum oxide, soda-lime glass, borosilicate glass, silica, aluminosilicate ceramic, limestone, gypsum, bentonite, precipitated sodium silicate, amorphous precipitated silica, amorphous precipitated calcium silicate, amorphous precipitated magnesium silicate, amorphous precipitated lithium silicate, sodium chloride, Portland cement, magnesium phosphate cement, magnesium oxychloride cement, magnesium oxysulfate cement, zinc phosphate cement and zinc oxide.

13. The method according to claim 1, further comprising producing the polyarylene sulfide resin particulate by washing a polyarylene sulfide resin with an aqueous solution of an organic acid metal salt or an inorganic acid metal salt.

* * * * *